United States Patent
Sachtleben et al.

(10) Patent No.: US 11,116,353 B2
(45) Date of Patent: Sep. 14, 2021

(54) COFFEE MACHINE

(71) Applicant: MELITTA EUROPA GMBH & CO. KG, Minden (DE)

(72) Inventors: Andreas Sachtleben, Minden (DE); Markus Schaefer, Blomberg (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 718 days.

(21) Appl. No.: 15/469,528

(22) Filed: Mar. 26, 2017

(65) Prior Publication Data

US 2017/0280922 A1    Oct. 5, 2017

(30) Foreign Application Priority Data

Mar. 29, 2016   (DE) ............... 10 2016 105 702.9

(51) Int. Cl.
*A47J 42/50*    (2006.01)
*A47J 31/42*    (2006.01)

(52) U.S. Cl.
CPC ............ *A47J 31/42* (2013.01); *A47J 42/50* (2013.01)

(58) Field of Classification Search
CPC ........ A47J 31/42; A47J 31/0573; A47J 42/50; A47J 31/44
USPC ......... 99/293, 295, 286, 287, 288, 279, 300, 99/304, 306, 307
See application file for complete search history.

(56) References Cited

U.S. PATENT DOCUMENTS

| | | | | |
|---|---|---|---|---|
| 4,925,682 A | * | 5/1990 | Miya | A23F 5/04 229/117.22 |
| 5,117,878 A | * | 6/1992 | Shaw | B67C 11/02 141/106 |
| 5,647,415 A | * | 7/1997 | Onders | B67C 11/02 141/331 |
| 6,405,637 B1 | * | 6/2002 | Cai | A47J 31/002 99/293 |
| 7,063,005 B1 | * | 6/2006 | Sit | A47J 31/42 99/286 |
| D635,398 S | * | 4/2011 | Watabe | D7/400 |
| 8,978,541 B2 | * | 3/2015 | Lai | A47J 31/3623 426/433 |
| 9,848,736 B2 | * | 12/2017 | Buffinga | B65D 83/0005 |
| 2009/0057332 A1 | * | 3/2009 | Arzola | B65D 25/52 221/102 |
| 2009/0304886 A1 | * | 12/2009 | Greenfield | A23F 5/04 426/467 |
| 2013/0095219 A1 | * | 4/2013 | de Graaff | A47J 31/42 426/433 |
| 2015/0034658 A1 | * | 2/2015 | Vastardis | A47J 43/27 220/592.16 |

(Continued)

FOREIGN PATENT DOCUMENTS

DE    2641509 B1    1/1978

*Primary Examiner* — Erin E Mcgrath
*Assistant Examiner* — Tiffany T Tran
(74) *Attorney, Agent, or Firm* — FisherBroyles, LLP; Robert Kinberg

(57) ABSTRACT

A coffee machine includes a brewing unit, a grinding mechanism to process coffee beans into coffee grounds that are used by the brewing unit to brew coffee, and a container for coffee beans. The container has a bottom surface with an outlet opening that leads to the grinding mechanism. The bottom surface is inclined toward the outlet opening and includes ridges extending in a direction of the outlet opening.

13 Claims, 4 Drawing Sheets

(56) References Cited

U.S. PATENT DOCUMENTS

2015/0075388 A1\* 3/2015 Deng .................... A47J 31/407
99/295

\* cited by examiner

COFFEE MACHINE

CROSS-REFERENCE TO RELATED APPLICATION

This application claims priority to German Application No. 10 2016 105 702.9, filed Mar. 29, 2016, the disclosure of which is incorporated by reference in its entirety.

BACKGROUND OF THE INVENTION

The present invention relates to a coffee machine, having at least one container for coffee beans with an opening in the bottom region that leads to a grinding mechanism, by means of which the coffee beans can be processed into coffee grounds, so that coffee can be brewed in a brewing unit, wherein a bottom surface of the container is designed to slope down toward the outlet opening.

German patent document DE 26 41 509 B1 shows a household coffee grinder where a storage container for coffee beans is positioned next to a coffee decanter. To move coffee beans to a grinding mechanism above the decanter, the container for the coffee beans can be displaced vertically and can be lifted so that coffee beans can be supplied via a pouring opening to the grinding mechanism. This type of operation is comparatively complicated, but the resulting design is a flat configuration for the coffee machine since the bean container is not arranged above the grinding mechanism.

U.S. Pat. No. 7,063,005 B1 discloses a coffee machine in which coffee beans are supplied via a bean container to a grinding mechanism, arranged above a brewing unit. The freshly ground coffee can then be used immediately after grinding for brewing coffee which is advantageous for the quality of the beverage. Arranging the bean container above the grinder allows the use of gravity to move the coffee beans. However, to completely empty the bean container, the bottom surface must be inclined. A secure emptying of the bean container is ensured only if the gravity exceeds other forces that prevent the coffee beans from sliding out of the container. The angle of inclination at the bottom of the bean container therefore must be relatively steep to ensure such a sliding of the coffee beans, which increases the structural size since the bean container with a predetermined volume must be embodied higher than a container having only a flat bottom surface for the container.

SUMMARY OF THE INVENTION

It is therefore the object of the present invention to create a coffee machine having a bean container with low structural height which allows the coffee beans to be supplied via the force of gravity.

The above and other objects are achieved according to the invention, wherein there is provided a coffee machine which in one embodiment comprises: a brewing unit; a grinding mechanism to process coffee beans into coffee grounds that are used by the brewing unit to brew coffee; and a container for coffee beans, the container having a bottom surface with an outlet opening that leads to the grinding mechanism, the bottom surface being inclined toward the outlet opening and including ridges extending in a direction of the outlet opening.

Thus, according to the invention, a bottom surface of the coffee bean container is inclined toward the outlet opening, wherein the bottom surface contains a plurality of ridges leading toward the outlet opening. As a result of the ridges, a contact surface between a coffee bean and a bottom surface of the container is reduced, and the ridges ensure that the adhesion forces between container bottom and coffee bean are reduced. Especially with coffee beans having high oil content, the problem of high adhesion forces on a flat surface prevents the beans from moving via the gravity, despite the inclination of the support surface. The ridges reduce the contact surface, so that the adhesion forces become smaller, as well as lead to the outlet opening, so that no mechanical structures hinder the sliding of the coffee beans.

The ridges are may be arranged star-shaped around the outlet opening. The ridges thus can move the coffee beans directly to the outlet opening.

According to a different embodiment, respectively one groove is formed between two adjacent ridges, wherein the width of the groove is less than 6 mm, in particular less than 4 mm, thus preventing a coffee bean from being stuck on a ridge since the coffee beans have a wider width. The groove can be tapered in the manner of a wedge toward the outlet opening. Alternatively, or in addition, it is possible to reduce the width of the ridge in the direction of the outlet opening. It is furthermore possible to have a ridge with constant width, for example between 1 mm and 4 mm, and to reduce only the width of the groove.

To achieve a sliding of the coffee beans via the force of gravity, the top of the ridges may be inclined relative to the horizontal line by less than 22°, in particular less than 20°. For example, the ridges can be inclined only ranging from 16° to 19°, which is noticeably below the angle of inclination needed for smooth surfaces, which generally have an angle of 23°. Given a corresponding diameter and/or a larger basic surface for the bean container and otherwise constant geometry, the change in the inclination angle by only 5° can result in an increase of the usable volume of more than 20 percent with respect to height. The inclination angle of the ridges and/or the bottom surface thus has a considerable influence on the filling volume of the coffee bean container.

To avoid that coffee beans are getting stuck, a distribution plate may be provided above the outlet opening, and the coffee beans move between an underside of the distribution plate and the ridges to the outlet opening.

To move the coffee beans optimally to the outlet opening, the number of ridges can increase with increasing distance to the outlet opening. The number of ridges can be smaller in an inside, ring-shaped region around the outlet opening than in a second ring-shaped region, arranged around the first ring-shaped region. Three ring-shaped regions having a different number of ridges may also be provided.

For a simple handling, the bean container can be attached to the coffee machine, to be detachable, in particular using a plug-in or snap-in or a bayonet connector. Other mechanical fastening means can also be used to remove the bean container from the coffee machine, for example for cleaning it in a dishwasher. The bean container can be composed of plastic, especially a transparent plastic, so that the filling volume is visible from the outside.

BRIEF DESCRIPTION OF THE DRAWINGS

The invention is explained in the following in further detail with the aid of an exemplary embodiment and reference to the enclosed drawings, wherein.

DETAILED DESCRIPTION OF THE INVENTION

Figure 1:
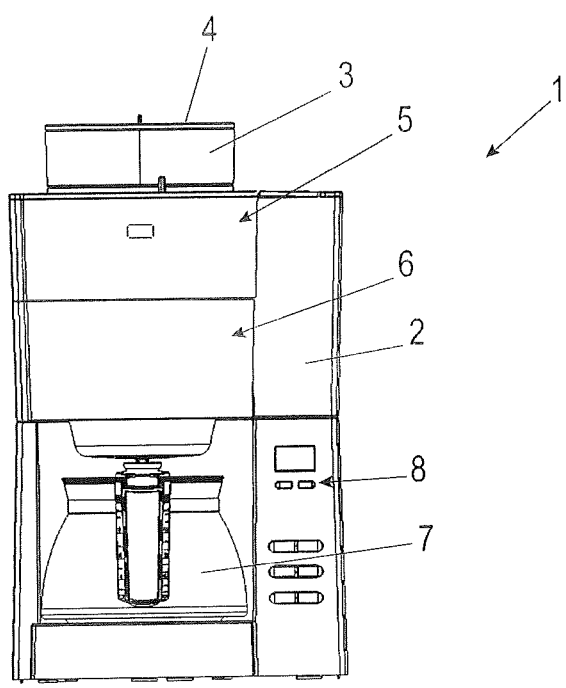
FIG. 1 is a view of a coffee machine according to the invention.

Referring to FIG. 1, there is shown a coffee machine 1 having a housing with a container 3 for coffee beans arranged on the top. The container 3 can be closed with a removable lid 4. A grinding mechanism 5 is arranged below the coffee bean container 3 for grinding coffee beans freshly prior to a brewing operation. The freshly ground coffee can be supplied by the grinding mechanism 5 to a brewing unit 6 where hot water from a reservoir 2 is used to brew coffee which then flows into a decanter 7. The coffee machine 1 is operated via an operating and control unit 8 provided on the housing.

Figure 2:
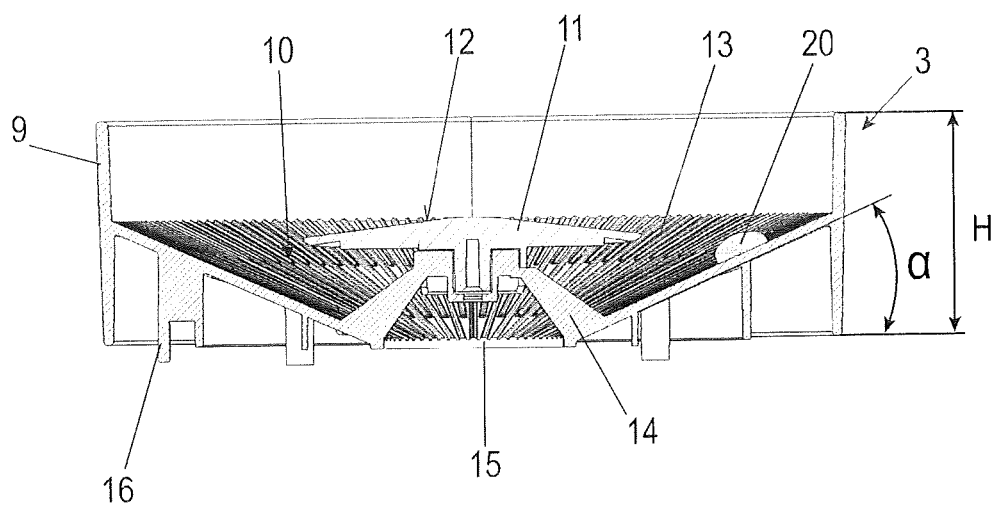
FIG. 2 is a detailed view of the bean container for the coffee machine according to FIG. 1.
Figure 6:
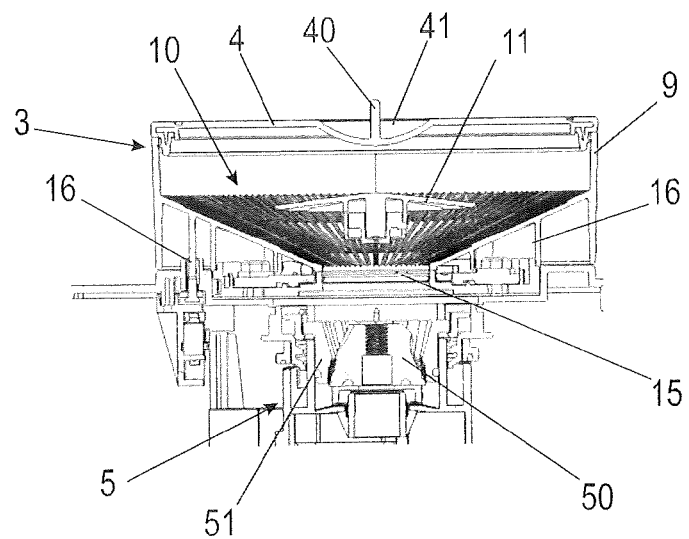
FIG. 6 is a sectional view through the bean container above the grinding mechanism.

The container 3 is shown in FIG. 2 without a lid 4 (see FIG. 6). The container 3 comprises an essentially vertical side wall 9 and a bottom surface 10 that is inclined downward toward an outlet opening 15. Above the outlet opening 15, a distribution plate 11 is arranged inside the container 3, which has a top surface 12 that is curved or which slopes toward the outside, to avoid that coffee beans remain on the distribution plate 11 which are not moved to the outlet opening 15.

The bottom surface 10 takes the shape of a truncated cone and extends between the outlet opening 15 and the side wall 9, wherein a plurality of ridges 13 are provided on the top surface of the bottom. The ridges 13 have a uniform height, for example ranging from 1 mm to 5 mm, and extend in a longitudinal direction toward the outlet opening 15. The ridges 13 are thus arranged star-shaped around the outlet opening 15.

The distribution plate 11 is held inside the container 3 via a holder having several arms 14 which extend from the bottom surface 10 to below a center region of the distribution plate 11. Between the arms 14, coffee beans 20 can slide with the force of gravity toward the outlet opening 15.

To ensure a sliding of the coffee beans 20 along the ridges 13, the top of the ridges 13 extends at an angle of inclination a, relative to the horizontal line, of between 15 and 22°, in particular 16 to 20°, so that the structural height H of the container 3 is comparatively low.

Figure 3:
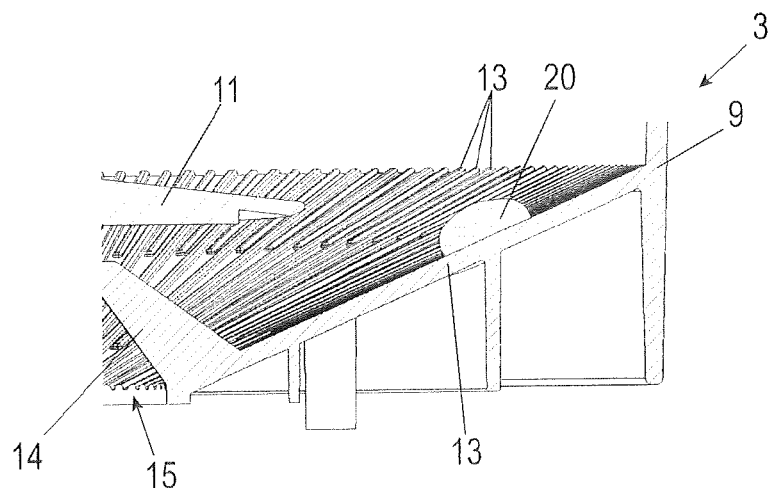
FIG. 3 is a detailed view of the bean container shown in FIG. 2.

FIG. 3 shows an enlarged view of a coffee bean 20 resting on a ridge 13. The ridges 13 can have a width between 0.8 to 4 mm, especially 1.5 to 3 mm. By arranging a plurality of ridges 13 on the bottom surface 10, the contact surface between the underside of the coffee bean and the bottom surface is reduced, so that the adhesion forces are low even with very oily coffee beans. As a result, the angle of inclination a can be embodied smaller than with containers 3 having a flat bottom surface.

Figure 4:
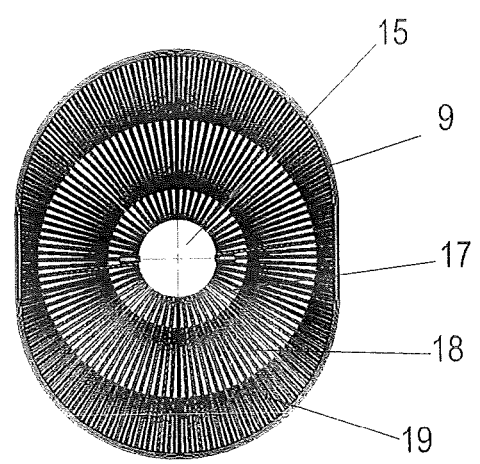
FIG. 4 is a view from above of the bean container shown in FIG. 2, without the distribution plate.
Figure 5:
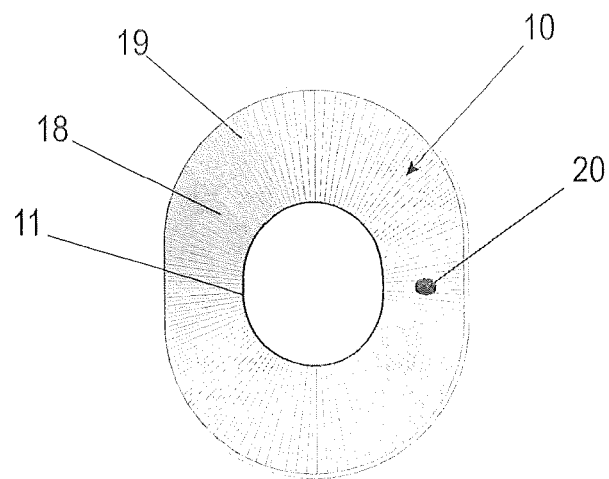
FIG. 5 is a view from above of the bean container shown in FIG. 2, showing the distribution plate.

As shown in FIGS. 4 and 5, the number of ridges 13 changes with increasing distance to the outlet opening 15. An inner ring 17 around the outlet opening 15 has a smaller number of ridges 13 than a center ring 18 of ridges that is arranged around the inner ring 17. In addition, an outer ring 19 contains more ridges than the center ring 18. Thus, even the regions located farther from the outlet opening 15 can be provided with enough ridges 13, so that the spacing between adjacent ridges measures less than 6 mm, in particular less than 4 mm, for example between 1 mm and 3 mm, to prevent a wedging of coffee beans 20 into a groove between two adjacent ridges 13.

The container 3 does not have a circular contour for the bottom surface 10, but is embodied elongated, meaning it is at least 20 percent longer in the longitudinal direction than in the width. The distribution plate 11 is also embodied elongated while the outlet opening 15 is circular.

FIG. 6 shows the bean container 3 installed above the grinding mechanism 5. The bean container 3 is provided with connecting stays or bars 16 on the underside, for securing and positioning the bean container 3 on the grinding mechanism 5, so that the outlet opening 15 is located above a rotating crushing tool 50 which is arranged inside a stationary crushing tool 51. The crushing tool 50 in this case rotates around a vertical axis, so that the ground coffee is moved downward, in particular is supplied to the brewing unit 6. A sealed closing element can be provided on the underside of the grinding mechanism, to avoid agglutination of the coffee grounds during the brewing of the coffee.

The container 3 is closed via a lid 4, containing a recessed gripping depression 41 in the center region, with a gripping handle 40 projecting upward. The structural height of the coffee machine 1 can thus be kept small owing to the container 3 and the flat lid 4.

It will be understood that the above description of the present invention is susceptible to various modifications, changes and adaptations, and that the same are intended to be comprehended within the meaning and range of equivalents of the appended claims.

What is claimed is:

1. A coffee machine, comprising:
a brewing unit;
a grinding mechanism to process coffee beans into coffee grounds that are used by the brewing unit to brew coffee;
a bean container for coffee beans, the bean container having a bottom surface with an outlet opening that leads to the grinding mechanism, the bottom surface being inclined toward the outlet opening and including ridges surrounding the outlet opening and extending in a direction of the outlet opening, wherein at least a portion of the ridges surrounding the outlet opening originate at an outer edge of the outlet opening.

2. The coffee machine according to claim 1, wherein the ridges are arranged star-shaped around the outlet opening.

3. The coffee machine according to claim 1, wherein adjacent ones of the ridges are separated by respectively one groove which is smaller than 6 mm in width.

4. The coffee machine according to claim 1, wherein adjacent ones of the ridges are separated by respectively one groove which is smaller than 4 mm in width.

5. The coffee machine according to claim 1, wherein the ridges have top surfaces that are inclined by an angle of less than 22° relative to a horizontal line.

6. The coffee machine according to claim 1, wherein the ridges have top surfaces that are inclined by an angle of less than 20° relative to a horizontal line.

7. The coffee machine according to claim 1, further comprising a distribution plate having an underside arranged above the outlet opening so that coffee beans move under the distribution plate and between the underside of the distribution plate and the ridges of the outlet opening.

8. The coffee machine according to claim 1, wherein the ridges increase in number with increasing distance from the outlet opening.

9. The coffee machine according to claim 8, wherein the bottom surface has a first inner ring-shaped region arranged around the outlet opening and a second ring-shaped region arranged around the first ring-shaped region, wherein the first inner ring-shaped region has fewer ridges than the second ring-shaped region.

10. The coffee machine according to claim 1, wherein the bean container is detachably attached to the coffee machine via a plug-in, snap-in, or bayonet connection.

11. The coffee machine according to claim 1, wherein the bean container is comprised of plastic.

12. The coffee machine according to claim 11, wherein the plastic is transparent.

13. A coffee machine, comprising:
   a brewing unit;
   a grinding mechanism to process coffee beans into coffee grounds that are used by the brewing unit to brew coffee;
   a bean container for coffee beans, the bean container having a bottom surface with an outlet opening which is centered in the bottom surface and leads to the grinding mechanism, the bottom surface being inclined toward the outlet opening and including ridges arranged around the outlet opening and extending in a direction of the outlet opening.

* * * * *